June 22, 1965  G. HOHWART ETAL  3,190,664
DIAPHRAGM GEAR CHUCK

Filed Aug. 30, 1962  2 Sheets-Sheet 1

INVENTORS.
George Hohwart
Paul Toth
BY
Harness, Dickey & Pierce
ATTORNEYS

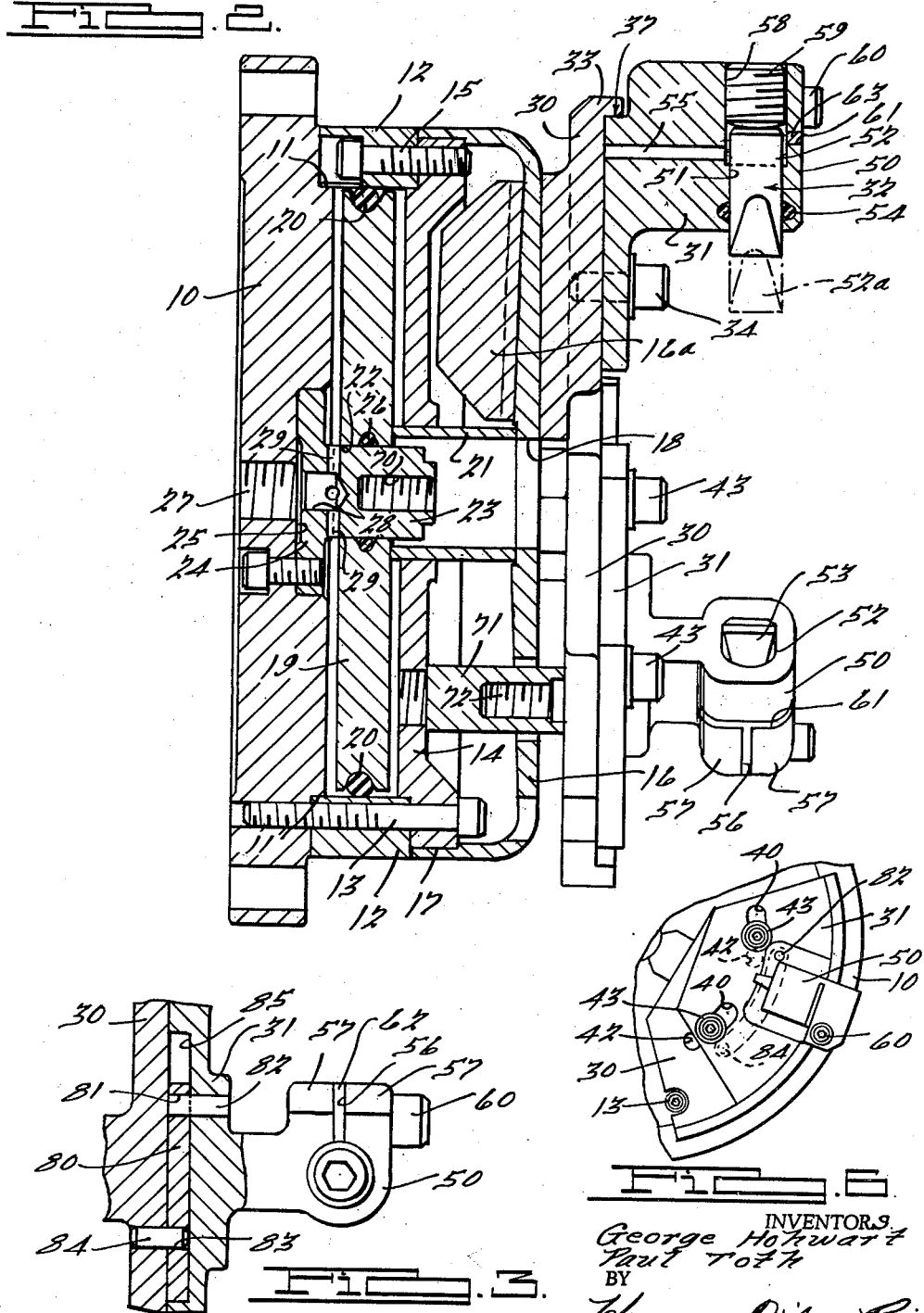

United States Patent Office 3,190,664
Patented June 22, 1965

3,190,664
DIAPHRAGM GEAR CHUCK
George Hohwart, Farmington, and Paul Toth, Allen Park, Mich., assignors to N. A. Woodworth Company, Detroit, Mich., a corporation of Michigan
Filed Aug. 30, 1962, Ser. No. 220,438
15 Claims. (Cl. 279—1)

This invention relates to diaphragm gear chucks and, more particularly, to a gear chuck of this type which is universal in character, being capable of holding gears of different sizes having widely different numbers and arrangements of teeth thereon.

An object of this invention is to provide a device of this type incorporating unique tooth spacer gages whereby the movable gear holding jaws may be circumferentially located in the precisely correct position for the number of teeth in the gear being chucked.

Another object of this invention is to provide a gear chuck of this type in which the gear engaging pins of the jaws are floatingly mounted so as to be self-adjusting whereby to facilitate ready engagement with the gear.

Another object of the invention is to provide means for adjustably securing the pin holder of the jaw member to its supporting member or jaw pad so as to be capable of considerable adjustment either side of its center line thereby increasing the versatility of the chuck.

The various objects and advantages, and the novel details of construction of one commercially practical embodiment of the invention, will become more apparent as this description proceeds, especially when considered in connection with the accompanying drawings, in which:

FIGURE 2 is a sectional view taken substantially on the plane indicated by line 2—2 in FIGURE 1;

FIGURE 3 is a detail sectional view taken substantially on line 3—3 in FIGURE 1;

FIGURE 4 is a fragmentary separated perspective view showing the tooth spacer gage and its associated parts; and FIGURES 5 and 6 are fragmentary plan views of a jaw member in extreme positions of circumferential adjustment.

Figure 1:
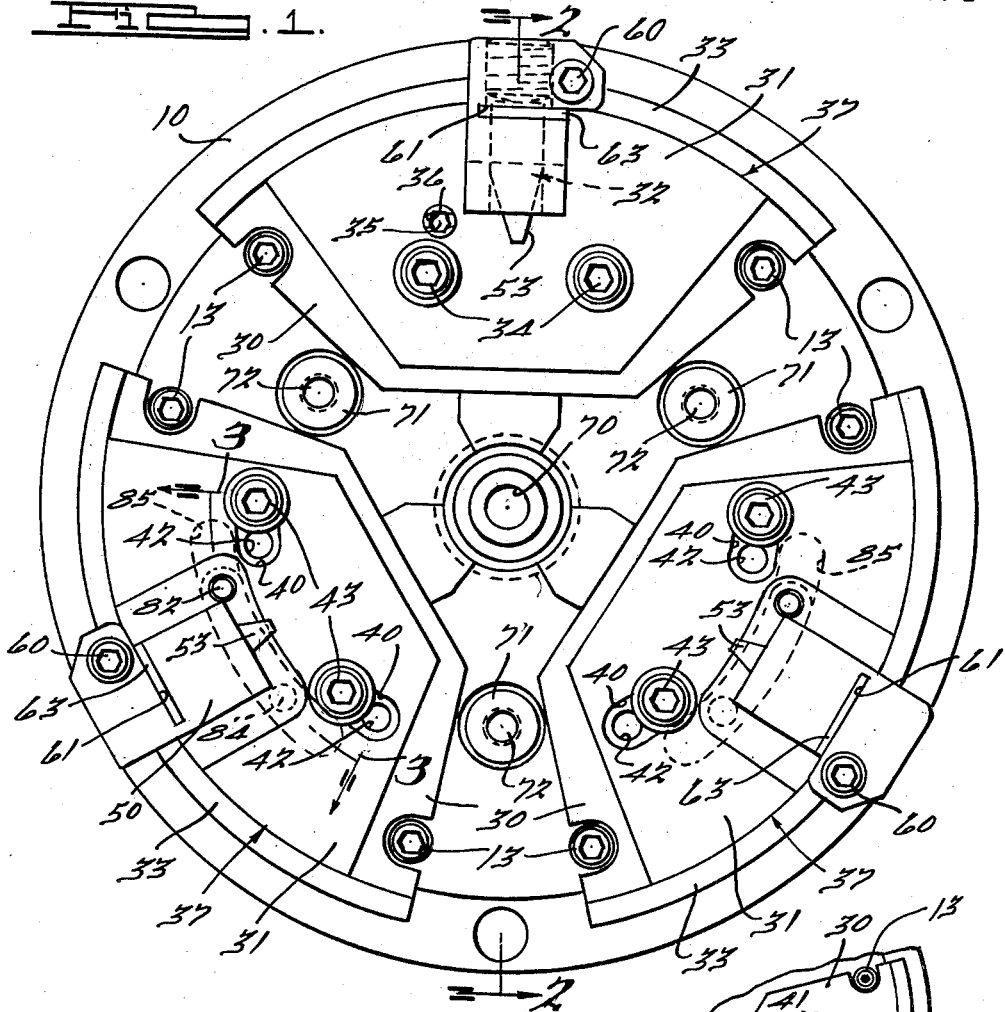
FIGURE 1 is a front face view of a diaphragm chuck constructed in accordance with this invention.

The present invention relates to diaphragm chucks primarily adapted for holding or chucking gears through the teeth thereof for some operation on the gear, as, for instance, finishing the bore thereof in the case of spur gears. The chuck may be adapted for chucking either external or internal gears, and either straight spur gears, helical gears, herringbone gears, or the like.

The invention about to be described relates to improvements in the jaw members or gear holding elements and is designed to render these jaw members substantially universal in character, so as to render them capable of holding gears of different sizes having widely different numbers and arrangements of teeth thereon.

It will be understood that the present invention is applicable to diaphragm chucks regardless of the specific construction of the same or whether they are manually, mechanically or fluid-pressure operated, the latter type of chuck being shown in the drawings by way of example.

The basic chuck constructioin is shown in Patent Number 2,568,585, dated September 18, 1951, assigned to the assignee of the present invention.

Referring now to the accompanying drawings, the diaphragm chuck there shown by way of example in FIGURES 1 and 2 comprises a disk-like mounting plate or adapter 10 adapted to be concentrically mounted upon the end of the spindle of a lathe, screw machine, grinder, or the like. The forward face of the mounting plate or adapter 10 is provided near its outer periphery with an annular shoulder 11 for receiving and piloting thereon a ring member 12, secured thereto in any suitable manner, as, for instance, by means of clamping screws 13. A disk-like backing member 14 is secured against the forward face of the ring member 12 by means of the clamping screws 13 and additional clamping screws 15. A substantially cup-shaped diaphragm 16 has its peripheral portion secured to the backing plate 14 as at 17. The diaphragm is provided with a central opening 18 and with counterweights 16a.

A piston 19 is slidably mounted in the ring member 12 between the mounting plate or adapter 10 and the backing plate 14 and its periphery is sealed with respect to the bore of the ring member 12 by any suitable type of sealing means such as an O-ring 20. A sleeve member 21 is positioned between the diaphragm 16 and the piston 19 to transmit thrust from the piston to the diaphragm to flex or spring the diaphragm axially outwardly to open the jaws of the chuck. The piston 19 is provided with a central opening 22 adapted to receive a plug member 23 carried by a mounting disk portion 24 received in a central recess 25 in the forward face of the adapter 10. An O-ring seal or the like 26 seals the joint between the plug 23 and the piston 19 against leaking.

The mounting plate or adapter 10 is provided with a central threaded opening 27 which communicates with a central opening 28 in the plug 23 and which, in turn, communicates with radial openings 29 in the plug 23 which lead to the space between the rear face of the piston 19 and the forward face of the mounting plate 10. With this construction, the application of fluid pressure to the opening 27 is effective to apply fluid pressure to the rear face of the piston 19 and the force thus applied thereto is transmitted through the sleeve member 21 to the center of the diaphragm 16 to spring or flex it axially outwardly to separate the jaw members to receive the gear part.

It will be understood that if the chuck is adapted to engage ring gears, or other internal gear parts, then the diaphragm 16 must necessarily be sprung in the opposite direction to move the jaw members inwardly, and in such a case the construction just described may be modified to apply the fluid pressure between the rear face of the backing plate 14 and the forward face of the piston to transmit a pulling force between the piston and the diaphragm. Also, it is contemplated that the chuck may be made double acting to overcome centrifugal force of the jaw members when used in high-speed applications.

The structure thus far described constitutes the basic chuck and forms no part of the present invention. As previously stated, this basic chuck construction is shown in Patent 2,568,585, dated September 18, 1951, owned by the assignee of the present application.

Three or more jaw members constructed in accordance with the present invention may be employed, three being preferred and being shown in the drawings by way of example.

Each jaw member comprises essentially a mounting portion comprising a fixed backing plate or jaw pad 30, a pin holder or jaw part 31 and a work or gear engaging member indicated generally by the reference character 32. Each backing plate or jaw pad 30 is permanently attached to the diaphragm 16 as, for instance, by being hydrogen-copper brazed thereto or in any other suitable manner. The backing plates 30 are segmental in shape and each is provided at its outer periphery with an inturned arcuate flange 33, the arc of which is struck from the central axis of the chuck. The pin holder 31 of one of the jaw members, for instance the one shown at the top of FIGURE 1, is fixed with relation to its backing plate 30 by means of clamping bolts 34 which pass through the member 31 into threaded openings (not shown) in the backing plate 30. This fixed member 31 is accurately located with respect to its backing plate 30 and with respect to the other jaw members by means of a locating pin 35 projecting from the backing plate 30 and extending through an opening 36 in the jaw part 31.

It will be noted that the jaw part or pin holder 31 of each of the jaw members is provided with an arcuate peripheral portion 37 adapted to engage the arcuate peripheral flanges 33 so as to concentrically locate the jaw member parts 31 with reference to the axis of the diaphragm chuck.

In the other two jaws members, the adjustable parts or pin holders 31 are circumferentially adjustable with respect to their mounting portions or backing plates 30. To provide for relatively extensive adjustment between the movable pin holders 31 and the backing plates 30 in each of the adjustable jaw members, pin holder 31 is provided with a pair of arcuate slots 40, each of the slots 40 being adapted to register with a pair of spaced threaded apertures 41 and 42 formed in the backing plate 30; see FIGURES 5 and 6.

Figures 4, 5:
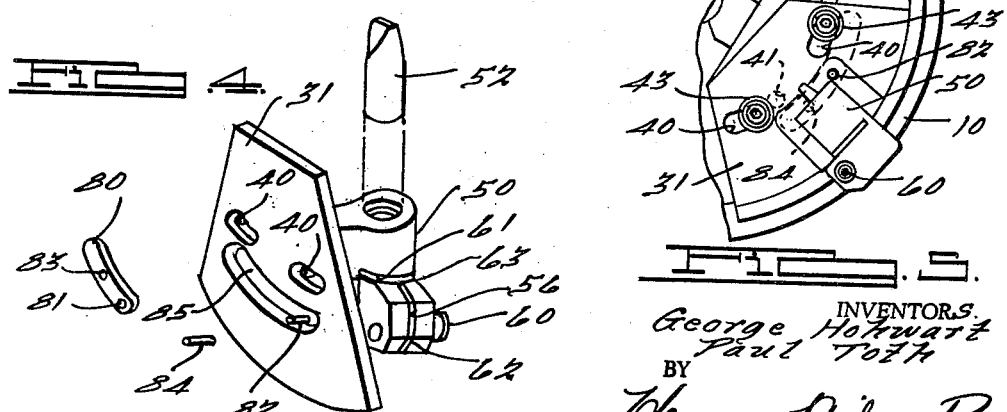

Clamping bolts 43 pass through the slots 40 and are adapted to engage either the threaded openings 41 or the threaded openings 42. When the clamping bolts 43 are engaged in the apertures 42, as shown in FIGURE 5, adjustment of the pin holder 31 is permitted to one side of the center line of the jaw member, and when the clamping bolts 43 are engaged in the other set of apertures 41, as shown in FIGURE 6, adjustment of the pin holder 31 to the other side of the center line of the jaw member is permitted. Thus, depending on the length of the arcuate slots 40 and the location of the threaded apertures 41 and 42, adjustment of the pin holder 31 at least 10° on either side of its jaw center line is provided for.

Each pin holder or movable jaw part 31 is provided with a boss 50 having a bore 51 adapted to receive a gear engaging pin 52 rotatably mounted therein. The gear pin 52 is provided with a tapered end portion 53 for engagement in the tooth space between a pair of adjacent teeth on the gear. These gear pins may be provided in different lengths, as indicated in dotted lines at 52a in FIGURE 2, so that gears of different diameters may be accommodated.

Each gear pin 52 is rotatably mounted in its bore 51 and is held in place by a tight O-ring 54. The O-ring 54 retains the gear pin in place, but permits it to rotate so that the tapered end thereof will align itself with the type of teeth on the gear being chucked. Also, this construction permits the gear pins to be removed so that other gear pins, for instance longer or shorter ones, may be inserted in the bore 51. Obviously, some clearance is necessary between the pins 52 and the bores 51 in order to permit rotation and replacement of the pins. The O-rings 54 hold the pins centered at all times in the bores, but the resilient nature of the O-rings permits the pins 52 to float or move laterally in the bores 51 within the limits of the clearances thus provided. This accommodates and adapts the pins 52 to normal variation in the gears or other work chucked by the pins.

For relieving any vacuum that may occur in the bore 51 when the gear engaging pin 52 is removed, the jaw part 31 is provided with a passageway 55 extending from the bore 51 to the meeting faces of the part 30 and 31 so that air may seep into the bore 51 to break the vacuum.

Each boss 50 is split longitudinally at one end thereof, as indicated at 56, to form a pair of bifurcations 57. Inside the bifurcated portion 57 is a threaded bore 58 adapted to receive a threaded lock screw 59 which engages the end of the gear pin 52 to limit its radial outward movement. By adjusting the lock screw 59 the gear pins 52 may be adjusted radially and the lock pin is secured in place by means of a clamping screw 60 extending through the bifurcated portions. Each boss 50 is also split transversely as indicated at 61 so that the clamping action of the bifurcations 57 does not contact the bore 51. The splits 56 and 61 may be provided with pads 62 and 63, respectively, see FIGURES 3 and 2, to seal the joints to keep out foreign matter.

From the description thus far, it will be noted that there are provided a fixed jaw member and two adjustable jaw members, and that each jaw member is provided with a floating mounted gear engaging pin 52 adapted to engage the gear being chucked. The pins 52 may be of the desired length, depending upon the diameter of the gear being held, and the mounting of these gear pins permits them to rotatably adjust themselves to properly engage the type of teeth on the gear.

The plug 23 may be provided with a threaded aperture 70 adapted to receive an adjustable stop pin to engage the end of a sleeve or flange on the gear being chucked to locate the same. The backing member 14 is provided with a plurality of studs 71 interiorly threaded to receive adjustable stop pins 72 adapted to engage the work to position the same.

Each of the adjustable jaw members is provided with a spacer gage in the form of a flat arcuate plate 80, see FIGURES 3 and 4, provided with an aperture 81 at one end thereof adapted to engage a dowel pin 82 projecting from the movable jaw part 31 and also provided with a second aperture 83 adapted to engage a dowel pin 84 projecting from the backing plate 30. This spacer gage plate 80 is adapted to seat in a recess or pocket 85 formed in the movable jaw part 31 at the face which abuts the backing plate 30. The location of the aperture 83 in the spacer gage plate 80 will vary in accordance with the number of teeth of the gear being chucked, and the distance between the centers of the apertures 81 and 83 will govern the adjusted position of the movable jaw part 31 and thus properly locate the movable part 31 circumferentially of the chuck.

In assembling these parts, the spacer gage 80 is inserted in the pocket or recess 85 with its aperture 81 in engagement with the dowel pin 82. The movable jaw part 31 is then positioned on the backing plate so that the second aperture 83 in the spacer gage 80 will engage the dowel pin 84. Thereupon, the clamping screws 43 are applied and tightened to hold the movable jaw part in its proper position circumferentially of the chuck. It will be understood that this spacer gage, which is called a tooth spacer gage, may have the center lines of the apertures 81 and 83 varied to correspond wtih the tooth spacing of the gears being chucked. In other words, a tooth spacer gage plate 80 may be provided for each gear having a different tooth spacing so that the movable part of the jaw may be properly located with respect to its backing plate when the movable part is assembled therewith for chucking that particular type gear.

The structure just described provides means for locating the movable jaw parts 31 in the precisely correct position for the number of teeth in the gear being chucked. To facilitate this, each tooth spacer gage plate 80 may be marked to correspond with the tooth spacing on the gear with respect to which it is to be used; for example, for a 23 tooth gear, the tooth spacer gage might be marked "23-T."

From the description of the device hereinbefore, it is believed that the manner of using the tooth spacer gage will be readily apparent. It will be understood that with the adjustments provided, the gear chuck is substantially universal in character, being capable of holding gears of different sizes having widely different numbers and arrangements of teeth thereon.

While one commercially practical form of the invention has been described and illustrated herein somewhat in detail, it will be understood that various changes may be made as may come within the purview of the accompanying claims.

What is claimed is:

1. In a diaphragm chuck having a diaphragm and means for flexing said diaphragm, that improvement which comprises, a plurality of jaw members secured to said diaphragm circumferentially thereof about the axis of said diaphragm, at least one of said jaw members comprising, a fixed mounting portion, a circumferentially adjustable work engaging member mounted on said mounting portion, and a gage member interconnecting said mounting portion and work engaging member for locating said work engaging member.

2. In a diaphragm chuck having a diaphragm and means for flexing said diaphragm, that improvement which comprises, a plurality of jaw members secured to said diaphragm circumferentially thereof about the axis of said diaphragm, at least one of said jaw members comprising, a fixed backing plate, a circumferentially adjustable gear engaging member mounted on said backing plate, and a gage member, selected in accordance with the character of the teeth on the gear to be chucked, interconnecting said backing plate and gear engaging member for circumferentially locating said gear engaging member in the correct position for the number of teeth on the gear being chucked.

3. A device as described in claim 1 in which the gage member consists of a plate member having apertures engaging dowel pins carried respectively by said work engaging member and said mounting portion.

4. In a diaphrgam chuck having a diaphragm and means for flexing said diaphragm, that improvement which comprises, a plurality of jaw members mounted on said diaphragm circumferentially about the axis thereof, means for securing one of said jaw members to said diaphragm in a predetermined fixed position, means for circumferentially adjusting each of the other jaw members comprising, a fixed backing plate, a jaw member circumferentially adjustable on said backing plate, a gage member interconnecting said backing plate and jaw member for circumferentially locating said jaw member, and means for clamping said jaw member to said backing plate in its adjusted position.

5. In a diaphragm chuck of the class described having a diaphragm and means for flexing said diaphragm, that improvement which comprises, a plurality of jaw members mounted on said diaphragm circumferentially about the axis thereof, each jaw member comprising a gear engaging member and means comprising an O-ring located between each jaw member and gear engaging member for rotatably mounting and resiliently supporting said gear engaging member for limited lateral movement in said jaw member.

6. A diaphragm gear chuck having a plurality of clamping jaws each provided with a work clamping pin, and a pin holder having a socket receiving the butt end portion of said pin, said socket being larger in diameter than said pin to provide radial clearance for the latter and said clearance being sufficient to permit lateral floating movement of said pin in said holder, and resilient means holding said pin normally centered and for rotation in said socket, whereby said pin is rotatably adjustable to accommodate different forms of gear workpieces and is laterally movable within limits defined by said radial clearance to compensate for individual variations in said workpieces.

7. A diaphragm gear chuck having a plurality of clamping jaws each provided with a work clamping pin, and a pin holder having a socket receiving the butt end portion of said pin, said socket being larger in diameter than said pin to provide radial clearance for the latter and said clearance being sufficient to permit lateral floating movement of said pin in said holder, and a resilient O-ring in said socket adjacent to the mouth thereof surrounding and frictionally engaging said pin, whereby to hold the latter centered and in a predetermined rotatably adjusted position in said socket, said pin being rotatably adjustable to accommodate different forms of gear workpieces and laterally movable within limits defined by said radial clearance to compensate for individual variations in said workpieces.

8. A diaphragm gear chuck having a plurality of clamping jaws each provided with a work clamping pin, and a pin holder having a socket receiving the butt end portion of said pin, said socket being larger in diameter than said pin to provide radial clearance for the latter and said clearance being sufficient to permit lateral floating movement of said pin in said holder, a resilient O-ring in said socket adjacent to the mouth thereof surrounding and frictionally engaging said pin, whereby to hold the latter centered and in a predetermined rotatably adjusted position in said socket, and an adjusting screw in said holder behind and butting endwise against said pin operable to adjust the pin axially in said socket, said pin being rotatably adjustable against the holding action of said O-ring and on the butting end of said screw to accommodate different forms of gear workpieces and being laterally movable within limits defined by said radial clearance to compensate for individual variations in said workpieces.

9. A diaphragm gear chuck having a plurality of clamping jaws each provided with a work clamping pin, and a pin holder having a socket receiving the butt end portion of said pin, said socket being larger in diameter than said pin to provide radial clearance for the latter and said clearance being sufficient to permit lateral floating movement of said pin in said holder, a resilient O-ring in said socket adjacent to the mouth thereof surrounding and frictionally engaging said pin, whereby to hold the latter centered and in a predetermined rotatably adjusted position in said socket, and adjusting screw in said holder behind and butting endwise against said pin operable to adjust the pin axially in said socket, and means for holding said adjusting screw firmly in a selected adjusted position, said pin being rotatably adjustable against the holding action of said O-ring and on the butting end of said screw to accommodate different forms of gear workpieces and being laterally movable within limits defined by said radial clearance to compensate for individual variations in said workpieces.

10. In a diaphragm chuck having a diaphragm and means for flexing said diaphragm, that improvement which comprises, a plurality of jaw members mounted on said diaphragm circumferentially about the axis thereof, means for rigidly securing one of said jaw members to said diaphragm in a predetermined fixed position, means for circumferentially adjusting each of the other jaw members comprising, a fixed backing plate, a gear engaging member circumferentially adjustable on said backing plate, and means for securing said gear engaging member to said backing plate comprising, a slot in said gear engaging member, a plurality of threaded openings in said backing plate adapted to register with said slot, and a threaded member adapted to pass through said slot and threadedly engage one of said threaded openings to clamp said gear engaging member to said backing plate in any one of a number of adjusted positions.

11. A diaphragm chuck of the type having jaw mounting portions on the diaphragm, work engaging members on said mounting portions, and means fastening said work engaging members to said mounting portions, at least one of said work engaging members being located circumferentially on its respective mounting by a gage member having a pair of locating elements coacting with the work engaging member and with the mounting portion respectively to locate said work engaging member in a predetermined adjusted position on said mounting portion, the spacing between said locating elements being directly related to the characteristics of the work to be chucked.

12. The combination as set forth in claim 1 wherein said gage member is provided with a pair of locating elements engageable with said jaw member and said mounting portion respectively to locate the said jaw member circumferentially on said mounting portion, and including means for holding said jaw member fixed to said mounting portion in said circumferentially located position.

13. A device as described in claim 11 in which said gage member is provided with spaced locating elements and said work engaging member and said mounting portion are provided with companion portions adapted to engage said locating elements to circumferentially locate said work engaging member on its mounting portion.

14. A diaphragm chuck comprising a diaphragm, jaw mounting portions on said diaphragm, means for flexing said diaphragm, a plurality of jaw members secured to said mounting portions circumferentially about the axis of said diaphragm, at least one of said jaw members comprising a circumferentially adjustable work engaging member mounted on said mounting portion, and a gage member interconnecting said mounting portion and work engaging member for locating said work of engaging member.

15. A device as described in claim 1 in which the gage member consists of a plate member having apertures spaced in accordance with the character of the teeth on the gear to be chucked, and fixed dowel pins on said gear engaging member and said backing plate engageable with said apertures to circumferentially locate said gear engaging member.

References Cited by the Examiner
UNITED STATES PATENTS

| | | | |
|---|---|---|---|
| 1,021,011 | 3/12 | Sponable | 279—1.1 |
| 1,288,577 | 12/18 | Hartmann | 64—17 |
| 2,394,624 | 2/46 | Matchett | 279—1.1 |
| 2,543,117 | 2/51 | Mackmann | 279—123 |
| 2,568,585 | 9/51 | Hohwart | 279—46 |
| 2,716,554 | 8/55 | Lowe | 279—123 |
| 2,758,843 | 8/56 | Coulson | 279—1.1 |
| 2,933,320 | 4/60 | Lyons | 279—123 |
| 3,006,653 | 10/61 | Benjamin | 279—1.1 |
| 3,035,447 | 5/62 | Carrigan | 279—123 |

ROBERT C. RIORDON, *Primary Examiner.*

UNITED STATES PATENT OFFICE
CERTIFICATE OF CORRECTION

Patent No. 3,190,664                                      June 22, 1965

George Hohwart et al.

It is hereby certified that error appears in the above numbered patent requiring correction and that the said Letters Patent should read as corrected below.

Column 3, line 38, for "therien" read -- therein --; line 64, for "part" read -- parts --; column 4, line 8, for "floating" read -- floatingly --; line 47, for "wtih" read -- with --; column 7, line 17, strike out "of".

Signed and sealed this 7th day of December 1965.

(SEAL)
Attest:

ERNEST W. SWIDER
Attesting Officer

EDWARD J. BRENNER
Commissioner of Patents